E. E. HENRY.
HACKSAW GRINDER.
APPLICATION FILED DEC. 27, 1918.

1,336,959.

Patented Apr. 13, 1920.
2 SHEETS—SHEET 1.

INVENTOR.
Eugene E. Henry
BY
ATTORNEY

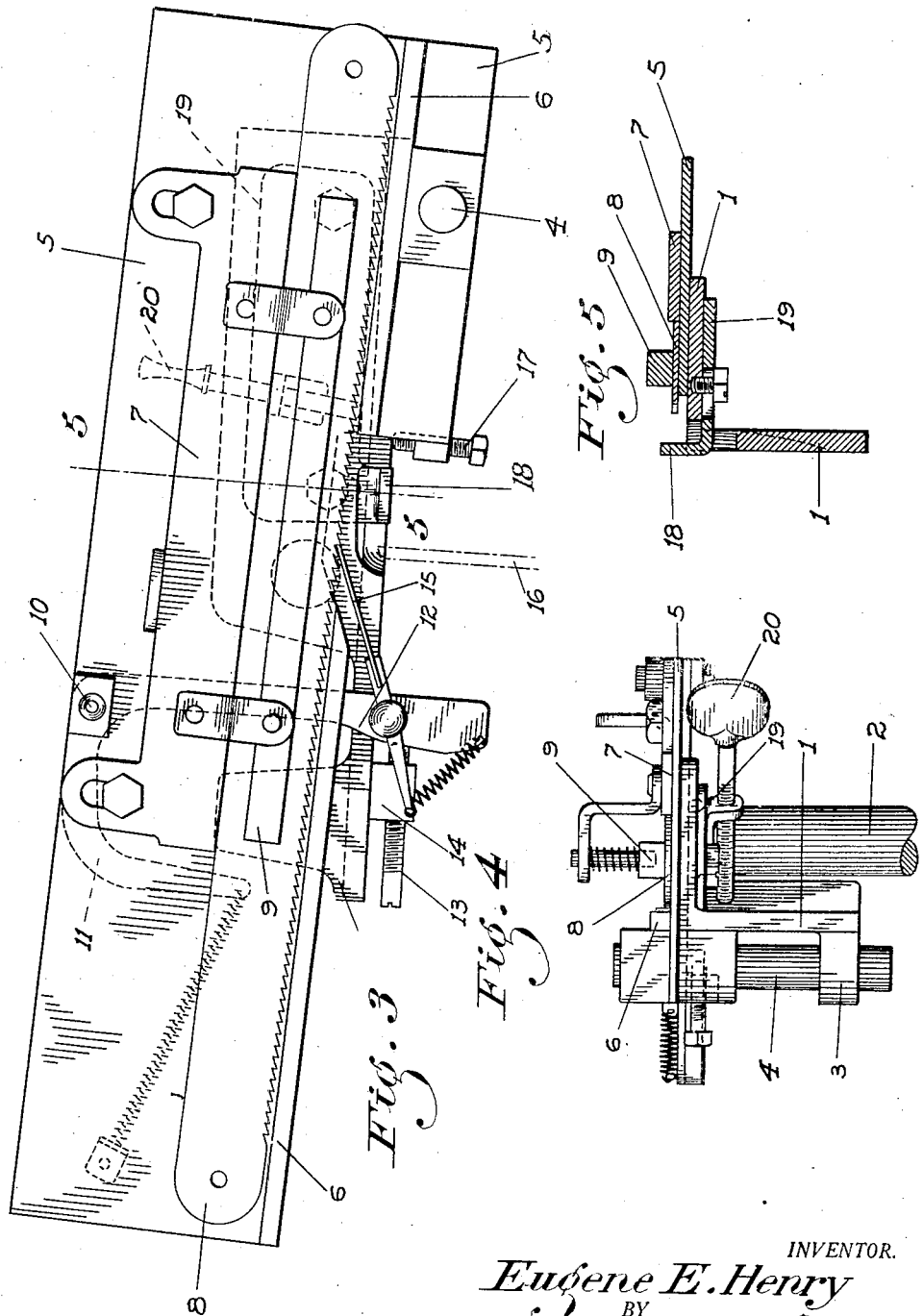

UNITED STATES PATENT OFFICE.

EUGENE E. HENRY, OF STOCKTON, CALIFORNIA.

HACKSAW-GRINDER.

1,336,959.   Specification of Letters Patent.   Patented Apr. 13, 1920.

Application filed December 27, 1918. Serial No. 268,461.

*To all whom it may concern:*

Be it known that I, EUGENE E. HENRY, a citizen of the United States of America, residing at Stockton, in the county of San Joaquin, State of California, have invented certain new and useful Improvements in Hacksaw-Grinders; and I do declare the following to be a clear, full, and exact description of the same, reference being had to the accompanying drawings, and to the characters of reference marked thereon, which form a part of this application.

This invention relates to improvements in hack saw grinders, the principal object of the invention being to provide a portable device which may be readily attached to any grinding wheel base or lathe bed, and by means of which the teeth of a hack saw may be quickly and accurately ground.

A further object has been to provide a device by means of which the saw will be automatically moved one tooth further along immediately upon the release of the saw from contact with the grinder, thus insuring quick work without any operations necessary other than the moving of the saw holding portions of the device back and forth from the grind wheel.

A still further object has been to provide a simple means for making adjustments whereby the width and depth of the teeth to be ground may be varied to suit different sizes of saws.

These objects I accomplish by means of such structure and relative arrangement of the parts as will fully appear by a perusal of the following specification and claims.

On the drawings, similar characters of reference indicate corresponding parts in the several views.

Fig. 3 is a top plan view, showing the saw out of contact with the grinder.

Fig. 4 is an end view of the device as shown in Fig. 1.

Fig. 5 is a cross section taken on a line 5—5 of Fig. 4.

Figure 1:
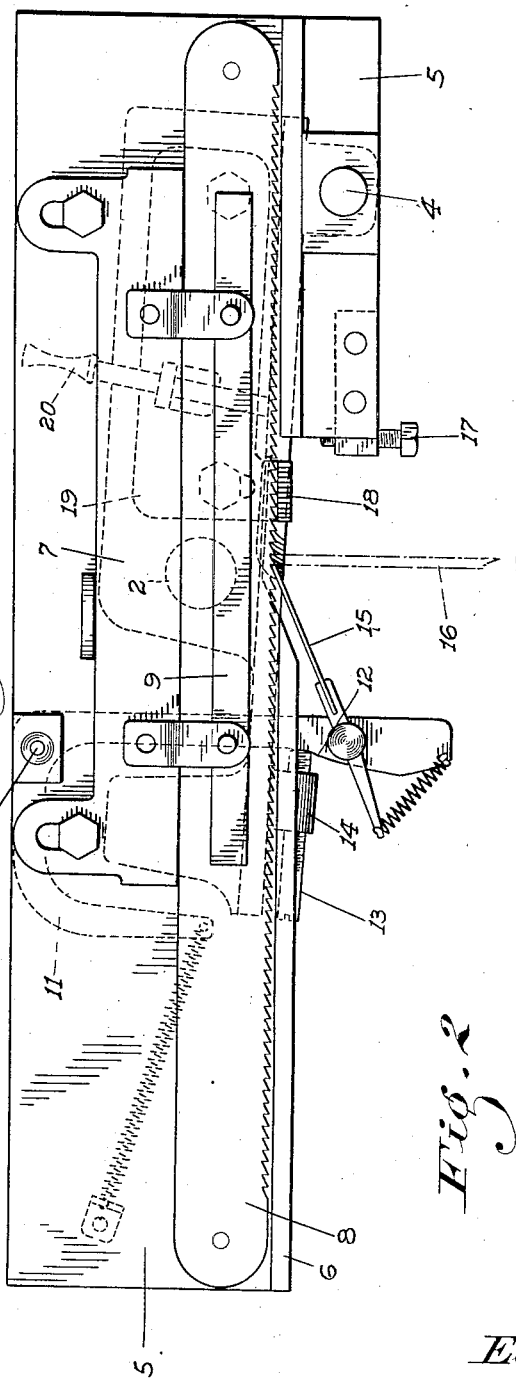
Figure 1 is a top plan view of the complete device, showing the saw in contact with the grind wheel.
Figure 2:
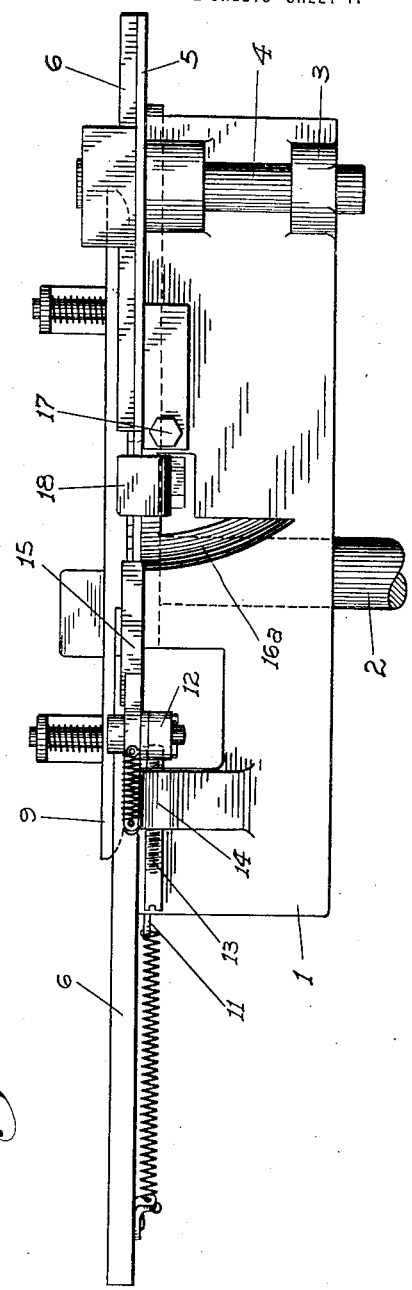
Fig. 2 is a side elevation of the same looking away from the grind wheel.

Referring now more particularly to the characters of reference on the drawings, the numeral 1 indicates a stationary base, preferably of inverted L-cross section. This base is provided with a rigid vertical post 2 adapted to be removably mounted to a lathe or grind wheel base.

At one end, the base 1 is provided with bosses 3 on its vertical side, in which are turnable a shaft 4 secured to a plate 5, extending over and resting on the top surface of the base 1.

The inner edge of this plate, which is referred to as that edge adjacent the grind wheel 16, is provided with a raised guide bar 6 except for a certain portion of its length near the center thereof.

Parallel to this bar is a transversely adjustable guide plate 7 running lengthwise of the plate 5 and adapted to be spaced the width of a hacksaw blade between the plate 7 and the bar 6.

Adapted to impinge on the saw blade is a spring pressed bar 9 suitably mounted to the guide plate 7 and movable therewith.

Under the plate 5 and pivoted thereto, as at 10, is a spring pulled lever arm 11 movable in a horizontal plane terminating in a cam portion 12 projecting beyond the plate 5 and away from the saw blade 8. This cam is adapted to engage the end of an adjustable screw 13 mounted in a boss 14 projecting from the base 1. Pivotally mounted on the top of the cam portion 12 is a spring pulled pawl 15 inclined at such an angle to the plate 5 and saw blade 9 that the outer end of the pawl will engage and hold in one of the teeth of the saw blade immediately adjacent the tooth being ground by the grind wheel, as shown in Fig. 1, the edge of this wheel projecting into a groove 16ª in the base 1.

Movement of the plate 5 relative to the base 1 and away from the grind wheel is limited by an adjustment screw 17 mounted on the under side of the plate 5, on a portion thereof which overlaps the inner face of the base 1.

Movement of the plate 5 toward the grind wheel 6, which movement governs the closeness of the saw teeth from the grind wheel and hence the depth of the tooth ground is governed by a lip 18 turned upward from an adjacent plate 19 mounted on the under side of the base 1. This adjustment may be regulated to a nicety by the screw 20.

Referring particularly to Figs. 1 and 3, the operation of the device is as follows:

The base 1 is first set up in a suitable position and a trial adjustment of the lip 18 relative to the grind wheel is made. This, as before stated, determines the depth to which the teeth may be ground.

Then, an adjustment of the screw 13 is made, the distance moved by the cam 12 operating the pawl 15 being the width or pitch of a saw tooth. Presuming everything is in readiness and the plate 5 in its outermost position, as shown in Fig. 3, the plate 5 is pressed in toward the grind wheel by the operator, the plate 5 of course turning on the shaft 4. This movement causes the cam 12 to slide on the end of the screw 13 and the lever 11, of which the cam is a part, being spring pulled, pulls the pawl 15 out of contact with one saw tooth and into contact with another by the time the limit of movement of the plate 5 toward the grind wheel has been reached. By this time, the tooth just released by the pawl 15 is being ground by the wheel 16, and when the plate 5 is pulled away from contact with the grind wheel, the cam is forced to climb on the screw 13 and thus pushes the pawl 15 ahead another tooth-width.

Assuming that the grind wheel remains in the same position, it will be seen that the depth of tooth ground maybe varied by moving the lip 18 in or out, this lip limiting the movement of the plate 5 and the saw thereon relative to the edge of the grind wheel.

Also, by adjusting the screw 17 outwardly the plate is allowed more outward movement and this in turn gives the cam and pawl a longer throw, and permits it to space a wider toothed saw.

Thus, from the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. A hack saw grinder comprising a base adapted to be mounted at right angles to the frame of a grind wheel, a plate pivoted to the base at one end thereof for limited swivel movement thereon to and from the grind wheel, means whereby a hack saw blade may be slidably mounted to the plate for longitudinal movement thereon, and a lip adjustably mounted on the base and adapted to abut against the teeth of the saw, whereby the movement of the saw toward the wheel may be governed.

2. A hack saw grinder comprising a base adapted to be mounted at right angles to the frame of a grind wheel, a plate pivoted to the base at one end thereof for limited swivel movement thereon to and from the grind wheel, means whereby a hack saw blade may be slidably mounted to the plate for longitudinal movement thereon, a spring-held cam pivotally mounted on the plate and adapted to abut against an adjustable screw mounted on the base, and a spring held finger member pivotally mounted on the cam and adapted to engage the tooth of the saw immediately behind the one being ground, the cam being released when the plate is moved toward the wheel, whereby the finger moves back to engage another tooth; and moving forward when the plate is moved away from the wheel, whereby another tooth will be placed in alinement with the wheel with each outward movement of the plate.

3. A hack saw grinder comprising a base adapted to be mounted at right angles to the frame of a grind wheel, a plate pivoted to the base at one end thereof for limited swivel movement thereon to and from the grind wheel, means whereby a hack saw blade may be slidably mounted on the plate for longitudinal movement thereon, a spring held cam pivotally mounted on the plate and adapted to abut against an adjustable screw mounted on the base, a spring held finger member pivotally mounted on the cam and adapted to engage the tooth of the saw immediately behind the one being ground, and an adjustment screw mounted on the plate and adapted to abut against the base when the plate is moved away from the wheel whereby the movement of the plate away from the grind wheel may be varied and the length of travel of the cam likewise governed.

In testimony whereof I affix my signature in presence of two witnesses.

EUGENE E. HENRY.

Witnesses:
BERNARD PRIVAT,
FRANK H. CARTER.